United States Patent [19]

Kálmán

[11] Patent Number: 4,951,700
[45] Date of Patent: Aug. 28, 1990

[54] EQUIPMENT FOR MEASURING THE YIELD OF OIL WELLS

[75] Inventor: Pintér A. Kálmán, Budapest, Hungary

[73] Assignee: Vegyimüveket Épitö és Szerelö Vállalat, Budapest, Hungary

[21] Appl. No.: 300,359

[22] Filed: Jan. 23, 1989

[30] Foreign Application Priority Data

Mar. 10, 1988 [HU] Hungary ............................. 1145/85

[51] Int. Cl.$^5$ ............................................. B01D 19/00
[52] U.S. Cl. ....................................... 137/174; 73/200;
55/216; 55/219
[58] Field of Search .................. 137/173, 174; 73/200;
210/123, 128; 55/216, 219

[56] References Cited

U.S. PATENT DOCUMENTS

| | | | |
|---|---|---|---|
| 1,670,728 | 5/1928 | Lorraine | 137/174 X |
| 2,831,350 | 4/1958 | Banks | 73/200 |
| 2,940,310 | 6/1960 | Henderson | 73/200 |
| 3,095,889 | 7/1983 | Barroll | 137/174 X |
| 3,251,374 | 5/1966 | Smith | 137/174 |
| 3,416,547 | 12/1968 | Glenn | 137/210 X |
| 4,625,744 | 12/1986 | Arnaudeau | 137/173 X |

Primary Examiner—Alan Cohan
Attorney, Agent, or Firm—Schweitzer & Cornman

[57] ABSTRACT

An apparatus is disclosed for the continuous and reliable measurement of the yield of oil wells. The fluid from the well, consisting of mixture of oil and gas, is directed into a two-phase separator having separate outlets for gas and liquid. Within the separator, or in direct communication therewith, is a combined liquid level and pressure regulator, which comprises a float supported by the liquid, and upper and lower pressure-compensated slide valves directly mechanically connected to the float and movable vertically therewith, simultaneously progressively closing one outlet while progressively opening the other. Downstream of the pressure-compensated slide valves there are separate yield-measuring devices for the oil and gas output, and further downstream is a mixture, where the components are recombined and thoroughly mixed. A water content meter can also be provided in the flow path for the separated liquid. The mechanism is extremely simplified and economical to install, yet is highly reliable for extended unsupervised service in the field, independent of electrical requirements.

7 Claims, 4 Drawing Sheets

EQUIPMENT FOR MEASURING THE YIELD OF OIL WELLS

Field of the Invention

The present invention relates to the continuous measurement of the yield of liquid and gaseous components of oil wells.

Background of the Invention

A pre-condition of economical recovery of oil fields in the planned nature of its exploitation. A sensible plan of exploitation can be composed exclusively on the basis of the experiences gained on the hydrocarbon site during exploration. The preparation of such a plan requires the knowledge of the characteristics of the hydrocarbon site. The yield of the oil well is the most important feature. Proper information on the yield of the oil well can be gained by continuous, individual measurement of the oil wells. That means that measuring of the well yield and other parameters represents a generally increasing requirement.

The requirements to be met by measuring the yield of oil wells are following:
  continuous measurement,
  low resistance,
  high reliability,
  operation without supervision, and
  relatively low expenditure.

Means are known for measuring the yield of oil wells for satisfying the above requirements. There are known means which are arranged on collecting station, for measuring the yield, of groups of wells and drilling islands. The basic principle of the operation of these grouped instruments is that the total output of the well is separated by a two-phase separation into liquid and gas, or by three-phase separation into oil, water and gas.

Accordingly, the mixture of gaseous and liquid components recovered from the oil well is separated either in a two phase or in a three phase separator. In case of two phase separation, after having separated the liquid and the gaseous components, the oil and the water content of the liquid are determined each by a separate measuring instrument.

The yield of the single components of the recovered mixture can be determined by the continuous measurement of the yield, volume (cubage) or by weighing the mass. The accuracy of the measurement of the yield of an oil well depends on the means of measurement measuring processes, and period of measuring.

The work of L.J. Lazovszkij, S.M. Szmotrickij: "Automatizacija izmerenja produkci nyeftjanik szkvazsin" gives a good survey of the presently used means for measuring the yield of oil wells.

Nevertheless, the aforementioned study does not deal with the well spread method. That method resides in the fact that two three-phase measuring separators are operated in the collecting station. One of the separators works with a lower outflow, while the other one with a higher outflow level. The measuring separator with the higher outflow continuously measures the collecting station, while the measuring separator with the lower outflow measures the yields of the single wells periodically, one by one. Accordingly, it is a shortcoming of the method that independent continuous measuring of the single wells is not possible.

The British Patent No. 2,179,156 discloses a device for measuring the yield of oil wells. This device tries to solve the problem of continuous measurement without separators. As is clear from the patent, the apparatus contains a small size separator, thus the separators could not be eliminated.

Experiments directed to the continuous and reliable measuring of the yield of oil wells (as is obvious from technical literature) aim even today at solving the problem of yield measurement without the use of separators. However, we are not aware of any publication disclosing a suitable solution for realization in this practice.

Summary of the Invention

The aim of the present invention is to provide apparatus for the continuous measurement of the yield of oil wells with low cost, high reliability and low resistance enabling operation without supervision.

To fulfill this task we prepared an apparatus for measuring the yield of oil wells, comprising a two-phase separator connected to an inflow stub delivering the mixture of liquid and gaseous components from the oil well, a liquid measuring device connected to the liquid outlet of the separator, a gas yield measuring device connected to the gas outlet of the separator, and a mixer connected to the liquid, and gas outlets of the measuring devices. The mixer is provided with a united liquid level control and pressure regulator comprising a float sensing the liquid level and two pressure compensated slide valves cooperating with the float and being movable in accordance with movements thereof. The slide valves are installed in a gas delivering and/or a liquid delivering passage downstream of the separator to regulate the discharge cross-section of the outlets for the gas and the liquid, depending on the position of the float.

The combined regulator, for regulating liquid level and pressure, can have a float arranged directly in the separator, or a float arranged outside the separator, in a separate armature.

To advantage, measuring orifices are used for measuring both liquid and gas yields. The main advantages of the measuring orifices are that they contain no moving elements, operate with satisfactory accuracy and reliability, and their measuring range can be changed within wide limits.

For determining the water content of the separated liquid components, either the liquid yield measuring instrument is connected to a water content meter measuring directly, or the water content is determined by calculation based on another measured parameter.

The operation of the apparatus of the invention is suitably controlled by a microprocessor control unit which performs the necessary calculation on basis of the measurement results. The microprocessor is adapted to receive central commands and to continuously control periodical exploitation of the oil well in accordance with a predetermined program.

Description of the Drawing

The invention is described below in greater detail with reference being had to the accompanying drawings, wherein.

Description of Preferred Embodiments

Figure 1:
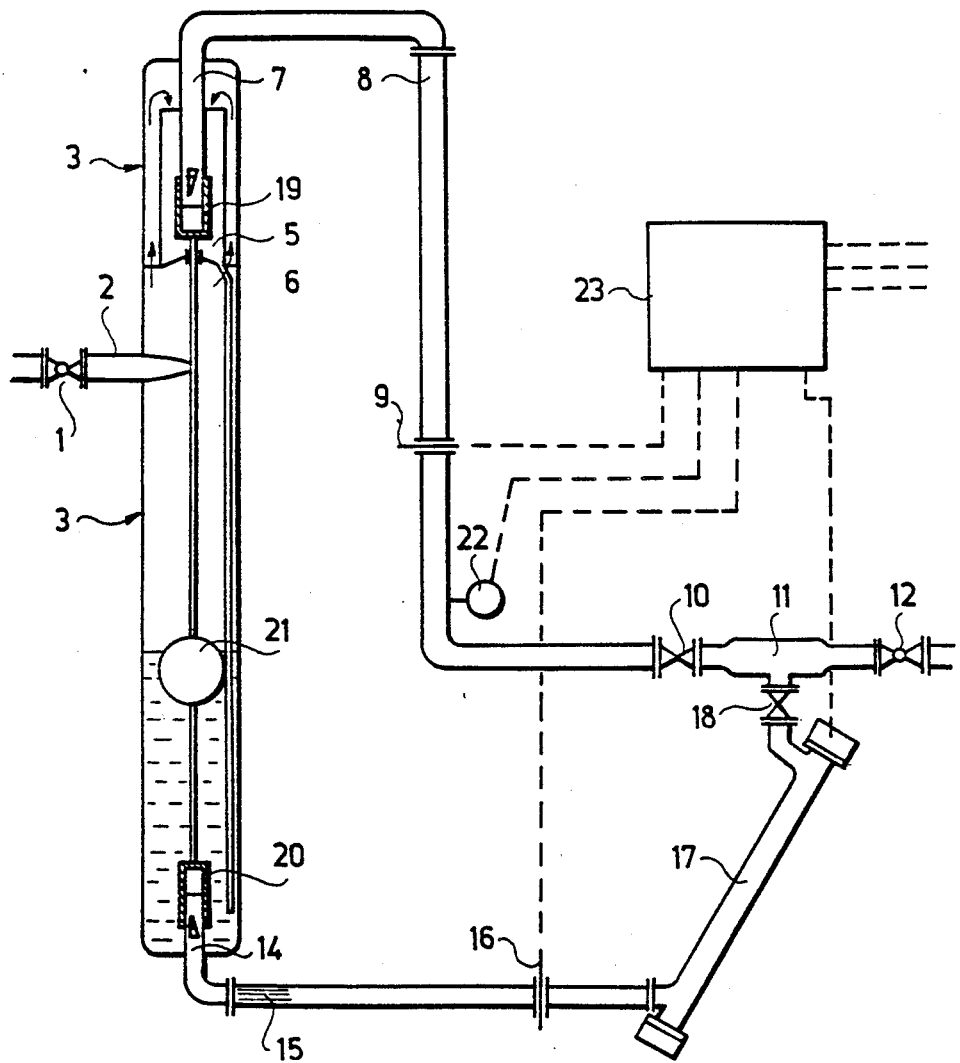
FIGS. 1 to 4 are simplified schematic representations of different embodiments of the apparatus for measuring the yield of oil wells.

In the embodiment of FIG. 1, the apparatus according to the invention is provided with a two-phase separator 3 into which mixture of liquid and gas recovered from the oil well arrives through a valve 1 and a tangential inflow stub 2. Inside the separator 3, the gas enters a drop separator 5. From the drop separator 5 the liquid, which has been separated from the gas, flows through a conduit 6 to a liquid space 13 provided in the lower portion of the separator 3. The separated gas flows into a gas outlet stub 7 in the upper portion of the separator 3 through variable openings controlled by a pressure compensated slide valve 19 of the combined regulator of liquid level and pressure. From there the gas flows through a flow regulator 8, a gas yield measuring device 9 (measuring orifice) and a check valve 10 into a mixer 11. The gas delivering conduit includes a built-in temperature sensor 22.

The liquid, separated from the incoming mixture of liquid and gas, is collected in the lower liquid space 13 of the separator 3. From there it flows through variable outlet openings controlled by a pressure compensated slide valve 20 of the combined liquid level control and pressure regulator into the liquid outlet stub 14. The liquid then passes through a flow regulator 15 into a liquid yield measuring instrument 16 (measuring orifice). From the liquid yield measuring device 16 the liquid flows through a water content meter 17, and from there it flows through a check valve 18 into the mixer 11.

In the mixer 11 the liquid and the gas are thoroughly mixed, and the mixture flows through a valve 12 into a suitable collector (not shown).

Figure 2:
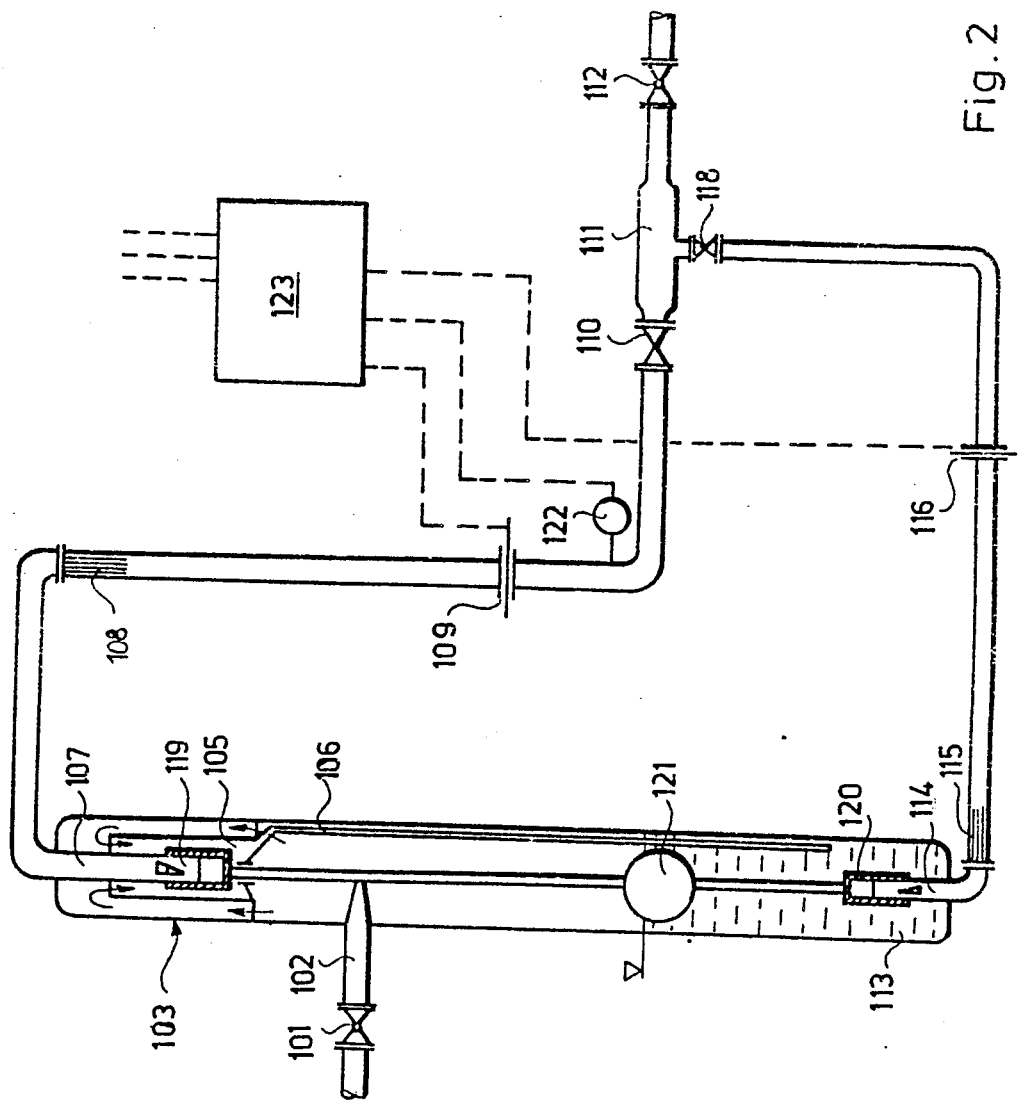

The pressure compensated sliding valves 19 and 20 of the combined liquid level control and pressure regulator are in a cooperating forced connection with a liquid level sensing float 21 arranged in the separator (FIGS. 1 and 2).

The equipment is provided with a microprocessor control unit 23 arranged with two-way signal connections with the gas yield measuring instrument 9, the liquid yield measuring instrument 16, the water content meter 17 and the temperature sensor 22, as well as with the inlet and outlet valve means 1 and 12.

The embodiment of the invention shown in FIG. 2, differs from that of FIG. 1 in that a water content meter (corresponding) to element !7 of FIG. 1, is not provided. Elements shown in FIG. 2 that correspond to those of FIG. 1 utilize corresponding reference numerals increased by 100 (i.e., 101 of FIG. 2 corresponds to 1 of FIG. 1).

Figure 3:
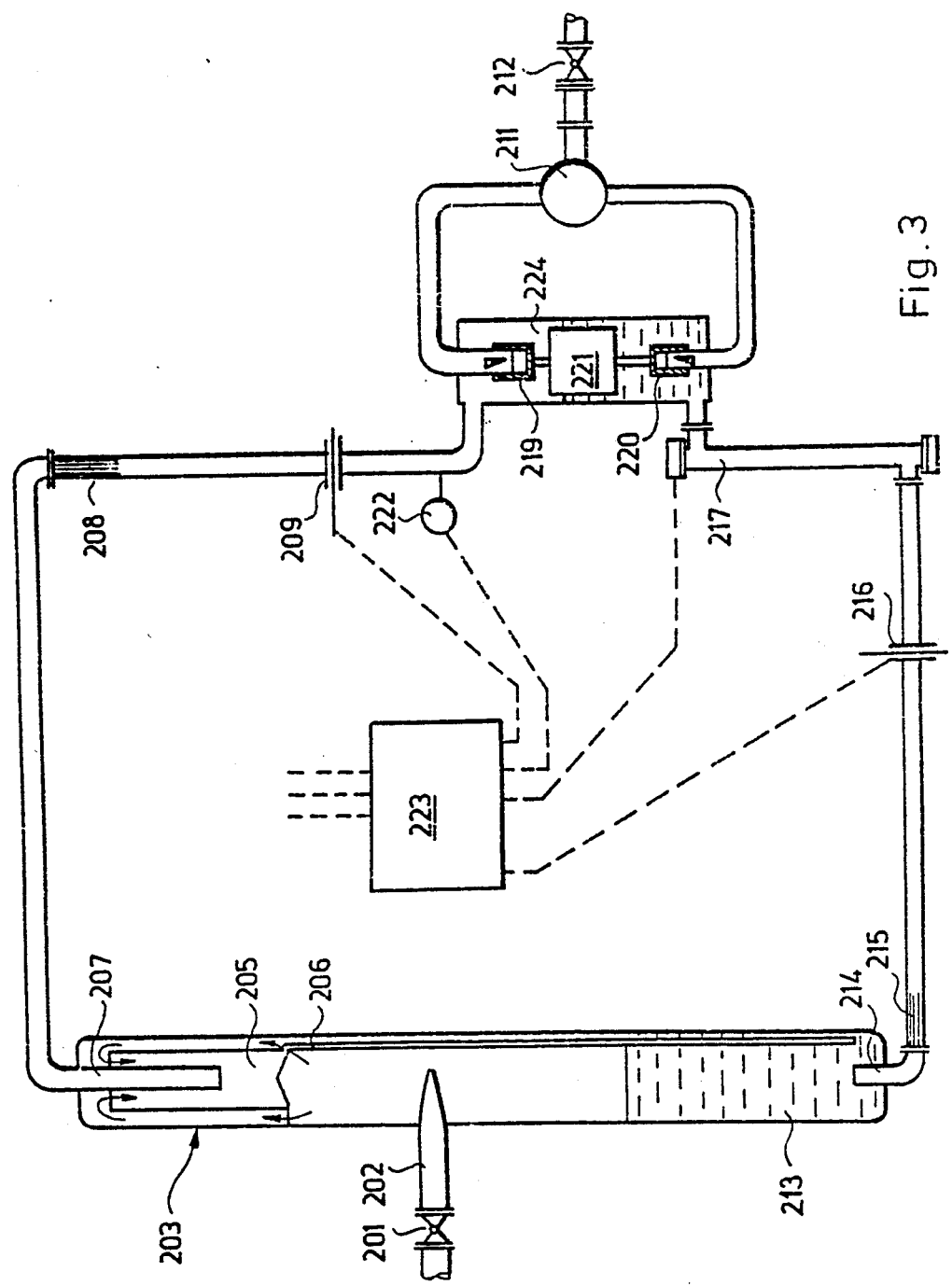
Figure 4:
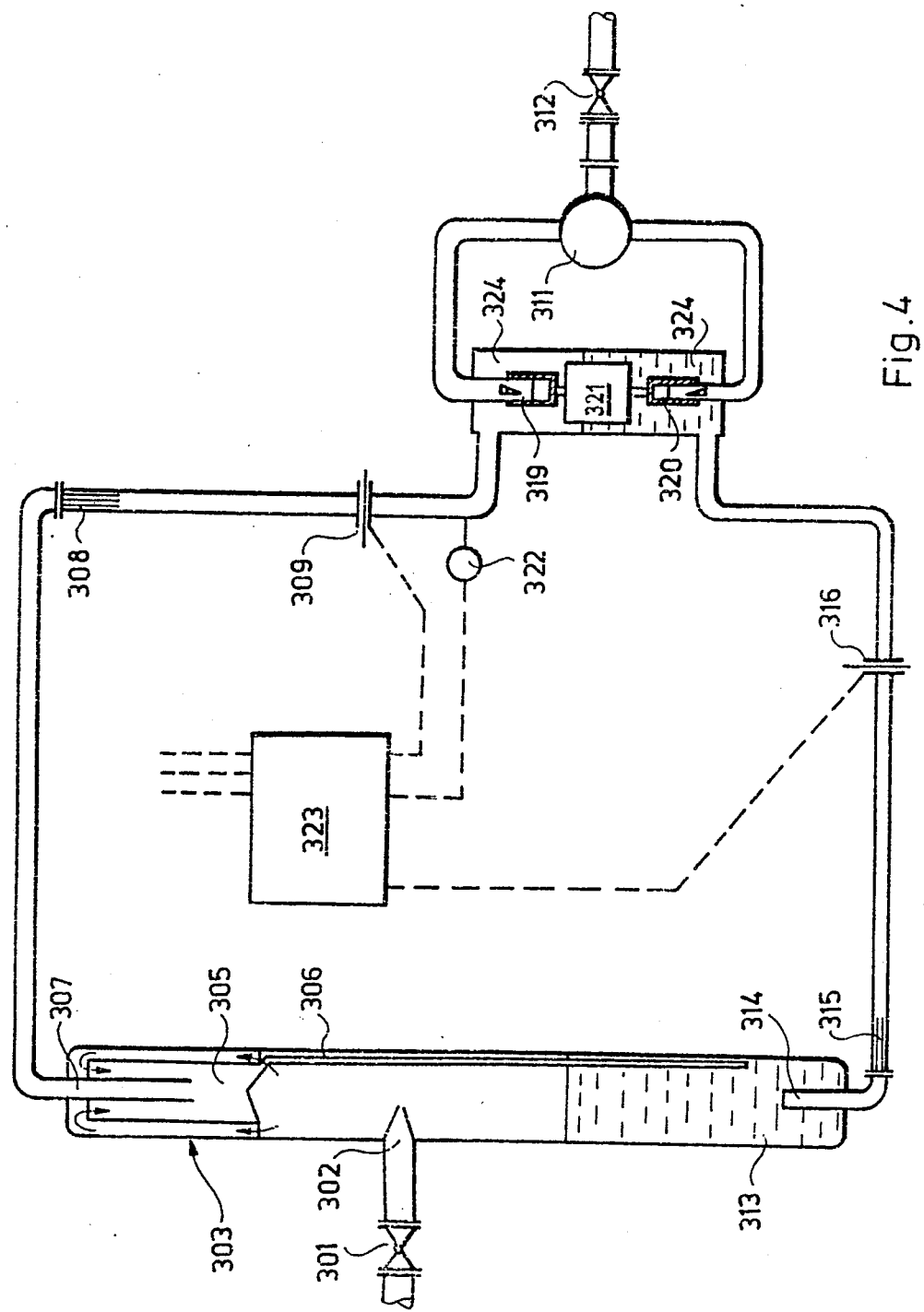

In the apparatus according to the invention, the combined liquid level control and pressure regulator can be also arranged outside the separator (see FIGS. 3 and 4). In the FIG. 3 embodiment, which generally corresponds in functions to the FIG. 1 embodiment, similar components are identified by reference numerals corresponding to those of FIG. 1, but increased by 200 (i.e., reference numerals 201 of FIG. 3 corresponds to 1 of FIG. 1).

In the embodiment of FIG. 3, the float 221 is arranged in a separate vertical housing 224. The housing 224 is connected at the top with the gas delivering conduit, downstream of the gas yield measuring instrument 209 and at the bottom with the liquid delivering conduit, downstream of the liquid yield measuring instrument 216. In the vertical (standing) housing 224, sliding valves 219 and 220 controlling the gas flow and the liquid flow, respectively, are in a cooperating forced connection with a float 221. The slide valve 219 is connected to the upper gas outlet stub, while the slide valve 220 is connected to the lower liquid outlet stub of the housing 224, controlling the discharge cross-sections. The upper outlet stub is connected via a gas delivering conduit, while the lower outlet stub is connected via a liquid delivering conduit, to the mixer II. In the mixer 11 the gas and the liquid are thoroughly re-mixed, and the mixture flows through a valve 212 into a collector (not shown).

The embodiment of FIG. 4 is similar to that of FIG. 3, and corresponding parts are identified by corresponding reference numerals in the "300" range. In the embodiment of FIG. 4. The water content meter (217 in FIG. 3) has been omitted. The functions of the FIG. 4 equipment thus correspond closely to those of the FIG. 2 embodiment.

The equipment according to the invention operates as follows (with reference numerals referring to the FIG. 1 embodiment unless the context indicates otherwise):

Continuous delivery of the liquid and the gas components, respectively, of the mixture, is achieved by means of the combined liquid level and pressure regulator comprising the pressure compensated slide valves 19 and 20, arranged in mechanical connection with the float 21 provided in the separator 3 (or in a separate vertical housing 224 or 324.) If the liquid level rises, the float 21 rises too. It correspondingly lifts the slide valve 20, which increases the discharge cross-section of the liquid outlet. Simultaneously, the slide valve 19, controlling the discharge cross-section of the gas, also rises narrowing (choking) the discharge cross-section the gas outlet. As a consequence, the pressure in the gas space of the separator 3 (or float housing, in the case of the embodiments of FIGS. 3 and 4) increases. Accordingly, an increased liquid flow leaves the separator.

If the liquid level in the separator drops, the float 21 moves downward. As a result, the slide valve 19 opens the discharge cross-section of the gas outlet, while the slide valve 20 correspondingly chokes the discharge cross-section of the liquid outlet. As a consequence, a new state of equilibrium is developed, which means that the delivery system is self-controlling.

When the yield of the oil well ceases, the check valves 10 and 18 automatically close to prevent reflux of mixture from the collector. When starting exploitation the equipment begins operating automatically, without external intervention.

By the proper programming of the microprocessor control unit 23, the equipment according to the invention may be rendered suitable for the control and measuring of periodical exploitation of oil. Control according to a given time program represents the easiest possibility. In this case the microprocessor control unit starts and stops the pumps of the system according to a predetermined time program. In the case of a gaslift exploitation, it opens or closes the gas charging valve, and simultaneously controls all the means of the system that take part in the exploitation. In case of this latter type of control it seems to be expedient to form the closing means 1 as remote operated unit.

According to another possible method for control of the periodical exploitation of an oil well, after having reached a given predetermined minimal yield value, the microprocessor control unit interrupts the exploitation and starts it again only after a certain span of time.

The equipment according to the invention is well suitable for the optimization of gaslift exploitation. In this case, the measuring of the amount of gas fed into the oil well is superfluous, as the equipment continuously measures the gas yield. The measuring equipment according to the invention enables continuous measuring of the yield of the oil well and guarantees the immediate detection of irregular functions of the system.

The continuous regulation according to the invention does not require auxiliary energy either in the liquid phase, or in the gas phase. Controlled operation is maintained even in the absence of current supply, and external intervention is not required when current supply returns.

The pressure drop within the equipment is relatively low. Its value corresponds always to the momentary yield.

Actuation of the equipment requires neither an operator nor constant supervision. The structural layout of the equipment is most simple, and its realization requires relatively low expenditure.

Due to the continuous measuring, measuring errors appearing in connection with the usual periodical methods need not to be reckoned with.

What we claim is:

1. In an apparatus for measuring the yield of oil wells, particularly where such yield may be irregular, which includes
   (a) a two-phase separator for receiving oil-gas mixture recovered from the well,
   (b) means for measuring the yield of the separated oil and gas flows,
   (c) and a mixer for re-combining the oil and gas flows after measurement, the improvement characterized by,
   (d) said apparatus including a combined pressure regulator and liquid level control,
   (e) said combined control including (i) a chamber communicating with the separated oil and gas fluids in said separator,
      (ii) a float member within said chamber and movable up and down therein as a function of the level of the separated oil, (iii) upper and lower pressure compensated slide valves in said chamber connected to said float and movable vertically therewith to progressively open one slide valve while progressively closing the other, and
   (f) fluid conduits connecting said slide valves with said mixer.

2. An apparatus according to claim 1, further characterized by
   (a) microprocessor means associated with said yield measuring means, and operative to interrupt the flow of said well for predetermined periods as a function yield conditions measured.

3. An apparatus according to claim 1, further characterized by
   (a) said chamber, said float, and said pressure compensated slide valves being located within said separator.

4. An apparatus according to claim 1, further characterized by
   (a) said chamber, said float, and said pressure compensated slide valves being external of said separator.

5. An apparatus according to claim 1, further characterized by
   (a) means associated with the flow conduit for oil, for measuring the water content of the oil.

6. An apparatus according to claim 1, further characterized by
   (a) said float member and said upper and lower pressure compensated slide valves being vertically aligned and rigidly connected for movement in unison.

7. An apparatus according to claim 1, further characterized by
   (a) check valves connected in said fluid conduits, between said slide valves and said mixer, to prevent return flow of fluids during interruptions in fluid flow from said well.

* * * * *